United States Patent
de Zeeuw et al.

(10) Patent No.: US 8,559,706 B2
(45) Date of Patent: Oct. 15, 2013

(54) FRAUD DETECTION USING IMAGE ANALYSIS

(75) Inventors: Aaron J. de Zeeuw, Dallas, TX (US); Jason L. Alexander, Rockwall, TX (US)

(73) Assignee: Match.com, LP, Dallas, TX (US)

( * ) Notice: Subject to any disclaimer, the term of this patent is extended or adjusted under 35 U.S.C. 154(b) by 131 days.

(21) Appl. No.: 13/307,868

(22) Filed: Nov. 30, 2011

(65) Prior Publication Data
US 2013/0136343 A1 May 30, 2013

(51) Int. Cl.
*G06K 9/00* (2006.01)

(52) U.S. Cl.
USPC ............................ 382/162; 382/165; 382/218

(58) Field of Classification Search
USPC ................ 382/162, 165, 167, 218, 219, 272; 347/19; 101/218; 358/1.9; 235/379; 713/181; 705/35, 39; 380/251
See application file for complete search history.

(56) References Cited

U.S. PATENT DOCUMENTS

| | | | |
|---|---|---|---|
| 7,097,269 B2 * | 8/2006 | Collette et al. ................. | 347/19 |
| 7,522,768 B2 * | 4/2009 | Bhatti et al. .................. | 382/167 |
| 8,238,653 B2 * | 8/2012 | Tajbakhsh et al. ............ | 382/167 |
| 2009/0164464 A1 | 6/2009 | Carrico et al. .................. | 707/5 |

OTHER PUBLICATIONS

Markov chain, From Wikipedia, the Free Encyclopedia, http://en.wikipedia.org/wiki/Markov_chain, 10 pages, Jul. 9, 2011.
Bayesian inference, From Wikipedia, the Free Encyclopedia, http://en.wikipedia.org/wiki/Bayesian_inference, 11 pages, Jul. 13, 2011.
Pending U.S. Appl. No. 13/307,986 entitled Fraud Detection Using Text Analysis, by Aaron J. de Zeeuw, et al., 52 pages, filed Nov. 30, 2011.

* cited by examiner

*Primary Examiner* — Anh Do
(74) *Attorney, Agent, or Firm* — Baker Botts L.L.P.

(57) ABSTRACT

In one embodiment, a method executed by at least one processor includes receiving an image associated with a user and analyzing, by the at least one processor, the image. The method also includes determining a set of colors of the image based on the analysis of the image and generating a representation of the image based on the determined set of colors. The method further includes comparing the representation of the image to one or more stored representations of a first set of images. The stored representations of the first set of images are based on sets of colors of the first set of images. The first set of images are associated with known users. The method also includes, in response to comparing the representation of the image to the one or more stored representations of the first set of images, determining that the user is a suspected fraudulent user.

24 Claims, 4 Drawing Sheets

| R | G | B |
|---|---|---|
| ⋮ | ⋮ | ⋮ |
| 56 | 86 | 131 |
| 54 | 83 | 158 |
| 46 | 71 | 114 |
| ⋮ | ⋮ | ⋮ |
| 170 | 208 | 242 |
| 170 | 208 | 242 |
| 170 | 208 | 242 |
| 170 | 208 | 242 |
| 170 | 208 | 242 |
| 170 | 208 | 242 |
| 35 | 54 | 92 |
| 35 | 54 | 92 |
| 30 | 49 | 83 |
| 84 | 128 | 165 |
| ⋮ | ⋮ | ⋮ |
| 126 | 172 | 213 |
| 30 | 49 | 83 |
| 85 | 128 | 166 |
| 126 | 172 | 213 |
| 126 | 172 | 213 |
| 126 | 172 | 213 |
| 126 | 172 | 213 |
| 126 | 172 | 213 |
| 126 | 172 | 213 |
| 103 | 149 | 187 |
| 112 | 158 | 197 |
| 126 | 172 | 213 |
| ⋮ | ⋮ | ⋮ |
| 85 | 128 | 166 |
| 170 | 208 | 242 |
| 56 | 86 | 131 |
| 195 | 148 | 104 |
| 195 | 148 | 104 |
| 195 | 148 | 104 |
| 195 | 148 | 104 |
| 195 | 148 | 104 |
| 56 | 86 | 131 |
| 170 | 208 | 242 |
| 56 | 86 | 131 |
| ⋮ | ⋮ | ⋮ |

| R | G | B |
|---|---|---|
| ⋮ | ⋮ | ⋮ |
| 3 | 5 | 8 |
| 3 | 5 | 7 |
| 3 | 4 | 7 |
| ⋮ | ⋮ | ⋮ |
| 10 | 12 | 14 |
| 10 | 12 | 14 |
| 10 | 12 | 14 |
| 10 | 12 | 14 |
| 10 | 12 | 14 |
| 10 | 12 | 14 |
| 2 | 3 | 5 |
| 2 | 3 | 5 |
| 2 | 3 | 5 |
| 5 | 7 | 10 |
| ⋮ | ⋮ | ⋮ |
| 7 | 10 | 12 |
| 2 | 3 | 5 |
| 5 | 7 | 10 |
| 7 | 10 | 12 |
| 7 | 10 | 12 |
| 7 | 10 | 12 |
| 7 | 10 | 12 |
| 7 | 10 | 12 |
| 7 | 10 | 12 |
| 6 | 9 | 11 |
| 6 | 9 | 11 |
| 7 | 10 | 12 |
| ⋮ | ⋮ | ⋮ |
| 5 | 7 | 10. |
| 10 | 12 | 14 |
| 3 | 5 | 8 |
| 11 | 9 | 6 |
| 11 | 9 | 6 |
| 11 | 9 | 6 |
| 11 | 9 | 6 |
| 11 | 9 | 6 |
| 3 | 5 | 8 |
| 10 | 12 | 14 |
| 3 | 5 | 8 |
| ⋮ | ⋮ | ⋮ |

FRAUD DETECTION USING IMAGE ANALYSIS

TECHNICAL FIELD

This invention relates generally to communication systems and more particularly to fraud detection using image analysis.

BACKGROUND

Networking architectures have grown increasingly complex in communications environments. In recent years, a series of protocols and configurations have been developed in order to accommodate a diverse group of end users having various networking needs. Many of these architectures have gained significant notoriety because they can offer the benefits of automation, convenience, management, and enhanced consumer selections. Using computing platforms with the networking architectures has allowed for increased communication, collaboration, and/or interaction.

One problem that has arisen is that certain users have attempted to co-opt the increased opportunity for communication for malicious purposes. For example, certain users have attempted to send unwanted advertising through the communicative platforms. As another example, certain users attempt to submit false profiles to assume a false identity on social networking services. One solution to this problem is to manually review reported incidents of such activity. This is problematic because it can be expensive and time consuming. Further, this may not prevent unwanted activity from occurring.

SUMMARY

In one embodiment, a method executed by at least one processor includes receiving an image associated with a user and analyzing, by the at least one processor, the image. The method also includes determining a set of colors of the image based on the analysis of the image and generating a representation of the image based on the determined set of colors. The method further includes comparing the representation of the image to one or more stored representations of a first set of images. The stored representations of the first set of images are based on sets of colors of the first set of images. The first set of images are associated with known users. The method also includes, in response to comparing the representation of the image to the one or more stored representations of the first set of images, determining that the user is a suspected fraudulent user.

In some embodiments, generating the representation of the image based on the determined set of colors may include determining a first set of colors present in the image. Each color of the first set of colors has a first color depth. Generating the representation of the image based on the determined set of colors may include determining a second set of colors from the first set of colors by mapping the first set of colors to a second color depth. The second color depth is less than the first color depth. Comparing the representation of the image to the one or more stored representations of the first set of images may include comparing the second set of colors to the one or more stored sets of colors of the first set of images. Comparing the second set of colors to the one or more stored sets of colors may include assigning a percentage to each color of the second set of colors based on a percentage of the image that corresponds to each color of the second set of colors. Further, this may include comparing the percentages associated with the second set of colors to the one or more stored sets of colors. Each of the stored sets of colors comprising percentages of colors present in the corresponding image of the first set of images.

In one embodiment, a system includes an interface configured to receive an image associated with a user. The system also includes at least one processor configured to analyze the image and determine a set of colors of the image based on the analysis of the image. The at least one processor is also configured to generate a representation of the image based on the determined set of colors and compare the representation of the image to one or more stored representations of a first set of images. The stored representations of the first set of images are based on sets of colors of the first set of images. The first set of images are associated with known users. The at least one processor is also configured to, in response to comparing the representation of the image to the one or more stored representations of the first set of images, determine that the user is a suspected fraudulent user.

Depending on the specific features implemented, particular embodiments may exhibit some, none, or all of the following technical advantages. Various embodiments may be capable of automatically detecting whether a user submitting an image should undergo additional review to determine whether the user is a fraudulent user. This may further reduce the number of items that need to be additionally reviewed. Other technical advantages will be readily apparent to one skilled in the art from the following figures, description and claims.

BRIEF DESCRIPTION OF THE DRAWINGS

For a more complete understanding of the present disclosure and its advantages, reference is made to the following descriptions, taken in conjunction with the accompanying drawings, in which.

DESCRIPTION OF EXAMPLE EMBODIMENTS

Figure 1A:
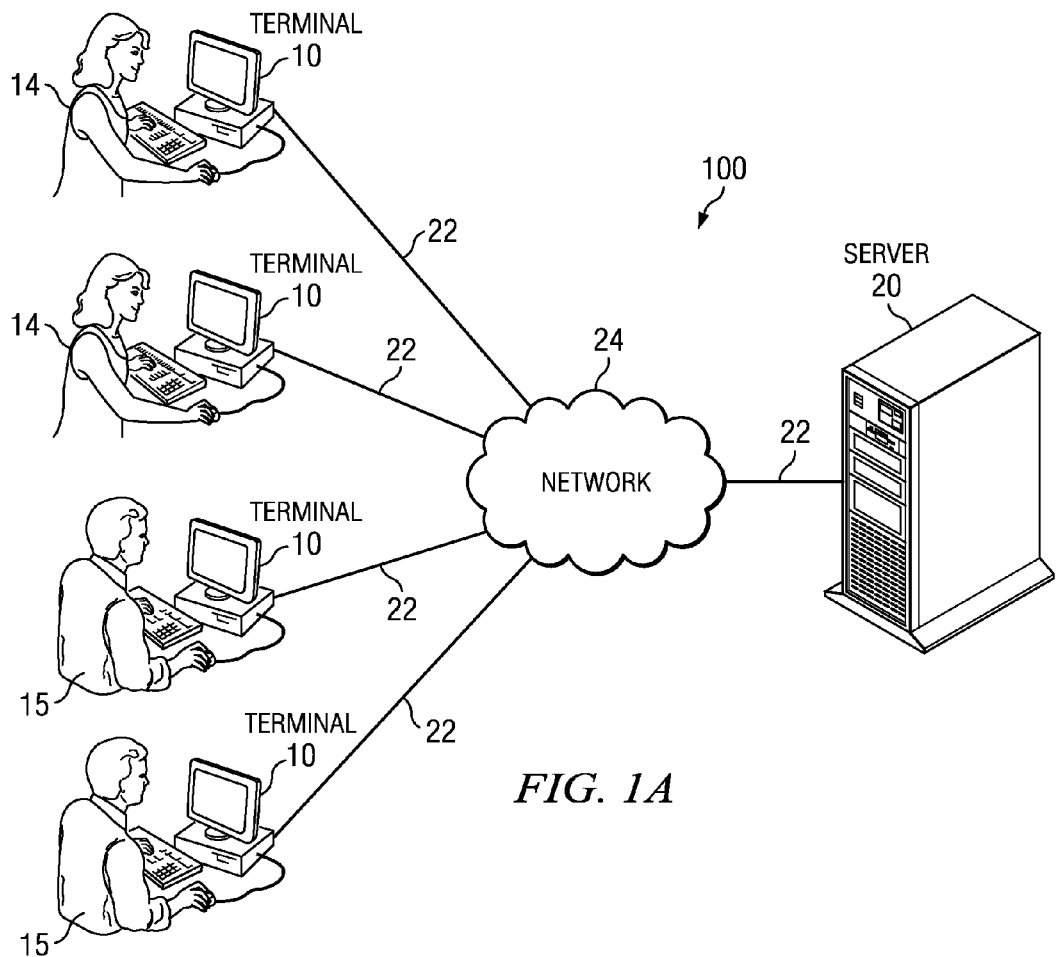
FIG. 1A is a simplified block diagram of a system for facilitating communication in a network environment, in accordance with a particular embodiment.
Figure 1B:
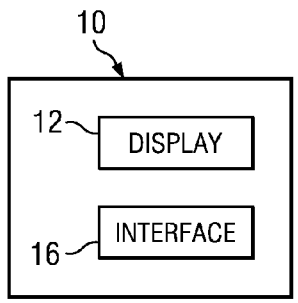
FIG. 1B shows the contents of the terminal from FIG. 1A.
Figure 1C:
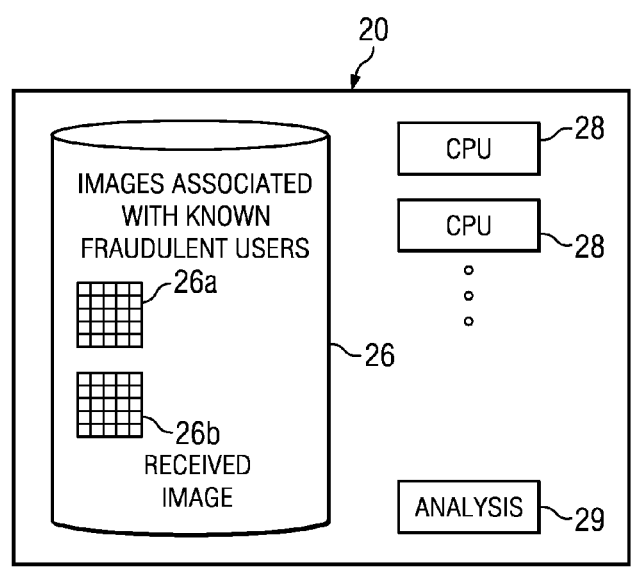
FIG. 1C shows the contents of the matching server from FIG. 1A.

Referring to FIG. 1A, one embodiment of a communication system is shown. FIG. 1A is a simplified block diagram of a system 100 for facilitating communication in a network environment. Users 14-15 interact with server 20 through terminals 10. FIG. 1B is a diagram showing, in one embodiment, certain contents of terminal 10. Terminal 10 comprises interface 16 (so that users 14-15 may be able to interact with terminal 10) and display 12. FIG. 1C is a diagram showing, in one embodiment, certain contents of server 20. Server 20 comprises memory 26, at least one CPU 28, and analysis module 29. Terminal 10 and server 20 are communicatively coupled via network connections 22 and network 24. In some embodiments, analysis module 29 may be configured to analyze images sent from users 14-15 and determine whether a user 14 or 15 associated with a submitted image is suspected as being a fraudulent user. In particular embodiments, a fraudulent user may include a user that submits: false information regarding personal descriptions, false information regarding demographic information, phishing messages, spam messages, unwanted advertising, harassing messages, and/or other submissions that may constitute an inappropriate use of a service provided by server 20.

Users 14-15 are clients, customers, prospective customers, or entities wishing to participate in an on-line dating scenario and/or to view information associated with other participants in the system. Users 14-15 may also seek to access or to initiate communication with other users that may be delivered via network 24. Users 14-15 may review data (such as profiles, for example) associated with other users in order to make matching decisions or elections. Data, as used herein, refers to any type of numeric, voice, video, text, or script data, or any other suitable information in any appropriate format that may be communicated from one point to another.

In one embodiment, terminal 10 represents (and is inclusive of) a personal computer that may be used to access network 24. Alternatively, terminal 10 may be representative of a cellular telephone, an electronic notebook, a laptop, a personal digital assistant (PDA), or any other suitable device (wireless or otherwise: some of which can perform web browsing), component, or element capable of accessing one or more elements within system 100. Interface 16, which may be provided in conjunction with the items listed above, may further comprise any suitable interface for a human user such as a video camera, a microphone, a keyboard, a mouse, or any other appropriate equipment according to particular configurations and arrangements. In addition, interface 16 may be a unique element designed specifically for communications involving system 100. Such an element may be fabricated or produced specifically for matching applications involving a user.

Display 12, in one embodiment, is a computer monitor. Alternatively, display 12 may be a projector, speaker, or other device that allows users 14-15 to appreciate information that system 100 transmits.

Network 24 comprises one or more communicative platforms operable to exchange data or information emanating from users 14-15. Network 24 could be a plain old telephone system (POTS). Transmission of information emanating from the user may be assisted by management associated with server 20 or manually keyed into a telephone or other suitable electronic equipment. In other embodiments, network 24 could be any packet data network offering a communications interface or exchange between any two nodes in system 100. Network 24 may alternatively be any local area network (LAN), metropolitan area network (MAN), wide area network (WAN), wireless local area network (WLAN), virtual private network (VPN), intranet, or any other appropriate architecture or system that facilitates communications in a network or telephonic environment, including a combination of any networks or systems described above. In various embodiments, network connections 22 may include, but are not limited to, wired and/or wireless mediums which may be provisioned with routers and firewalls.

Server 20 is operable to receive and to communicate information to terminal 10. In some embodiments, server 20 may comprise a plurality of servers or other equipment, each performing different or the same functions in order to receive and communicate information to terminal 10. Server 20 may include software and/or algorithms to achieve the operations for processing, communicating, delivering, gathering, uploading, maintaining, and/or generally managing data, as described herein. Alternatively, such operations and techniques may be achieved by any suitable hardware, component, device, application specific integrated circuit (ASIC), additional software, field programmable gate array (FPGA), server, processor, algorithm, erasable programmable ROM (EPROM), electrically erasable programmable ROM (EEPROM), or any other suitable object that is operable to facilitate such operations. In some embodiments, server 20 may comprise one or more clusters of virtual or hardware-based computing nodes, a distributed computing infrastructure, or other suitable forms of providing a software service using multiple computers. In some embodiments, server 20 may offer one or more services to users 14 and 15 via network 24 such as social networking, professional networking, conference services, messaging, gaming, online dating, marketplace, discussion board, news, or other suitable services. Server 20 can be used to identify and to evaluate suitable candidates in various areas (e.g. hiring/employment, recruiting, real estate, general person searches, online dating, etc.).

In some embodiments, memory 26 may include multiple storage structures 26a and 26b, one or file systems, as well as other suitable structures for storing and retrieving data. For example, storage structures 26a and 26b may be implemented using one or more databases, file systems, tables, stacks, heaps, or other suitable storage structures.

In some embodiments, users 14-15, using terminals 10, register with server 20. Registration may include users 14-15 submitting information to server 20 about users 14-15 as well as characteristics with which users 14-15 are seeking to be matched. Such information may include user handles, which may be a combination of characters that uniquely identifies users 14-15 to server 20. In various embodiments, server 20 may be configured to collect this information; for example, server 20 may be configured to ask users 14-15 to respond to a series of questions. Questions posed by server 20 may include questions seeking narrative responses from users 14-15, such as one or more paragraphs of text. Server 20 may also pose questions to users 14-15 that may require shorter responses, such as a single character, a single word, a phrase, multiple phrases, or one or more sentences. Server 20 may be configured to receive the information submitted by users 14-15 and create profiles for users 14-15 based on that information, storing the profiles in memory 26. In some embodiments, server 20 may be configured to facilitate the delivery of messages sent from users 14-15. The example scenarios discussed above may include server 20 receiving images from users 14-15. For example, server 20 may receive images submitted with a profile description. As another example, server 20 may receive an image with a message. As another example, server 20 may receive an image as part of a profile modification.

As an example only, user 14 can access the Internet via terminal 10, travel to a web site managed by server 20, and register for a service. As part of the registration process, server 20 may ask user 14 a series of questions which identifies characteristics about user 14. Thus, server 20 may ask about the height, weight, age, location, and ethnicity of user 14. It may also ask about the birthplace, parents, eating habits, activities, and goals of user 14. In particular embodiments, server 20 may prompt user 14 for a narrative description of user 14 that may include characteristics of user 14 and characteristics that user 14 prefers in a match. In some embodiments, server 20 may specify that any number of questions or requested descriptions are necessary before registration may be concluded. Server 20 may also request that user 14 submit one or more images as part of the registration process. After concluding the registration process, server 20 may store the responses of user 14 as a profile. This same process may be repeated by several different users, causing server 20 to contain a plurality of profiles. In some embodiments, by providing accurate information, the various users have submitted genuine textual and image information to server 20 and the various users may not be considered fraudulent users. Another example of users 14 submitting genuine information to server 20 and not being considered fraudulent users is sending messages to be delivered by server 20 that are not attempts by the users to present unwanted advertisements (i.e., spam), to elicit private information (i.e., phishing attempts), or to engage in other generally elicit or undesirable activities.

As an other example, a user 15 may provide information to server 20 similar to user 14 described in the example above. In particular embodiments, server 20 may prompt user 15 for a narrative description of user 15 that may include characteristics of user 15 and characteristics that user 15 prefers in a match. Server 20 may also prompt user 15 to submit one or more images. However, user 15 may have a malicious intent and submit fraudulent text or images. Such fraudulent text or images may include false information regarding personal descriptions and/or demographic information. User 15 may attempt to register a false profile with server 20 for malicious purposes. Such purposes may include accessing information of other users of server 20, attempting to deceive other users of server 20, circumventing restrictions of services provided by server 20, and accessing protected information stored on server 20. Another example of fraudulent text that may be submitted by user 15 is messages to be delivered by server 20 that include unwanted advertisements (i.e., spam), attempts to elicit private information (i.e., phishing attempts), or attempts to engage in other generally elicit or undesirable activities. Performing some or all of the above-mentioned activities may cause user 15 to be considered a fraudulent user.

In some embodiments, analysis module 29 may be implemented using any suitable combination of hardware, firmware, and software. Analysis module 29 may be configured to analyze images submitted by users 14 and 15 to determine whether users 14 and 15 should be suspected as fraudulent users. Images received by server 20 that will be processed by analysis module 29 may be stored in storage structure 26b. Analysis module 29 may use images associated with known fraudulent users and/or known genuine users stored in memory 26 in such determinations. For example, storage structure 26a may include such images. Analysis module 29 may compare images submitted by users 14 and 15 to stored images associated with known fraudulent users and/or known genuine users by comparing representations of the images based on the colors used in the images to each other. For example, analysis module 29 may determine that a match exists between an image submitted by user 15 and an image associated with a known fraudulent user by determining that the colors used in each of the images are the same or similar. In some embodiments, hashes may be determined for the submitted images and the stored images when comparing the colors. Examples and further explanation of how analysis module 29 may determine whether users 14 and/or 15 should be suspected as fraudulent users are discussed below with respect to FIG. 2. In some embodiments, analysis module 29 may provide an advantage by automatically suspecting a user as a fraudulent user and providing a human analyst with the information to make the determination of whether the user is actually a fraudulent user without the need for manual review of every submission of every user of server 20.

Figure 2:
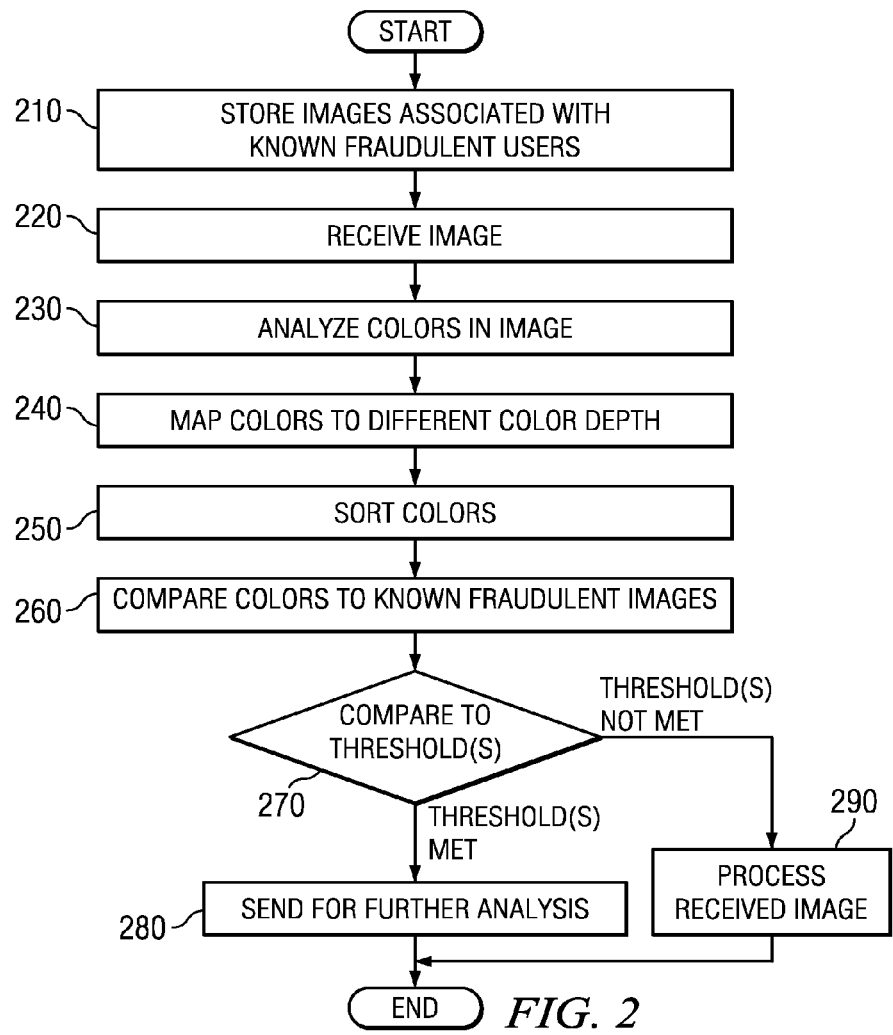
FIG. 2 is a flowchart illustrating one embodiment of automatically suspecting a user as a fraudulent user by analyzing an image.

FIG. 2 is a flowchart illustrating one embodiment of automatically suspecting a user as a fraudulent user by comparing an image to known fraudulent images and known genuine images. In general, the steps illustrated in FIG. 2 may be combined, modified, or deleted where appropriate, and additional steps may also be added to the example operation. Furthermore, the described steps may be performed in any suitable order. In some embodiments, the steps described below may be performed by any suitable combination of the elements discussed above with respect to FIGS. 1A-1C.

At step 210, in some embodiments, images associated with known fraudulent users and/or known genuine users may be stored. This may be done at server 20 of FIG. 1A. Images may be stored in store structure 26A of FIG. 1C. The images stored at this step may be determined by examining activity performed by a user associated with the image. The determination of which images to store at this step may be made by identifying images associated with users determined to be fraudulent or users that have been banned from using one or more services offered by server 20. Modifications to, or hashes of, images associated with known fraudulent users and/or known genuine users may be stored at this step. For example, copies of each image with different color depths may be stored at this step. For example, if a known fraudulent user submitted an image that is to be stored at this step with a color depth of 128 bits, copies of the image at 64 bits, 32 bits, 16 bits, and/or other suitable color depths may also be stored at step 210. Representations associated with known fraudulent users and/or known genuine users may be stored at this step. For example, the colors used in each image stored at this step may be determined and may be placed into a one or more lists, arrays, matrices, or other suitable storage structures. The colors associated with each image stored at this step may be stored in a list ordered by the amount that each color is present in the associated image. Copies of the image at different color depths may also have this process performed such that multiple lists of the colors present in an image corresponding to different color depths of the image may be stored at step 210. Each of these lists may also be sorted by the amount that each of the colors is present in the image. In some embodiments, the lists of colors are examples of hashes of the image.

Figure 3A:
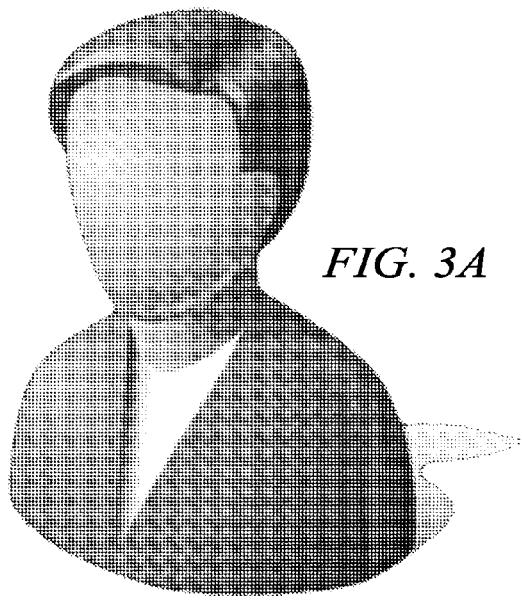
FIGS. 3A-3B illustrate an example image and sample pixel values.
Figures 3B, 3C, 3D:
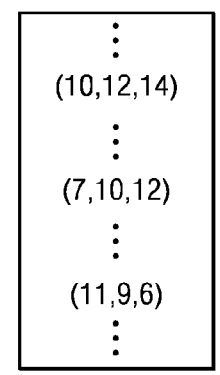
FIGS. 3C-3D illustrate pixel values determined from the sample pixel values of FIG. 3B.

At step 220, in some embodiments, an image may be received by server 20. A user, such as users 14 or 15 of FIG. 1A, may have submitted the image to server 20. The image depicted in FIG. 3A is an example of an image that may be submitted at this step. For example, user 14 may have submitted the image in a request to register with a service offered by server 20. The image may be a profile picture. Server 20 may invoke analysis module 29 of FIG. 1C in response to receiving the image at this step. This may be done to determine whether the user submitting the image should be suspected as being a fraudulent user. At step 230, in some embodiments, the colors in the image received at step 220 may be analyzed. This may be performed by analysis module 29 of FIG. 1C. It may be determined what color depth is used in the image received at step 220. For example, it may be determined that the image received at step 220 uses a color depth of 128 bits. The format of the image received at step 220 may be determined. For example, it may be determined what compression algorithm may have been used in the image received at step 220. At step 230, a conversion may occur to convert the image into a format for analysis. For example, if the image received at step 220 was in a compressed format such as the JPEG format, the image may be converted into an uncompressed format such as a bitmap (BMP) format. Other suitable conversions or transformations may occur. FIG. 3B indicates pixel values in RGB format at a color depth of 8 bits for the image depicted in FIG. 3A and serves as an example of the analysis that may be performed at step 230.

At step 240, in some embodiments, the image received at step 220 may be mapped to a different color depth. This may be performed by analysis module 29 of FIG. 1C. This may be performed as part of a hashing procedure for the image received at step 220. For example, if the image received at step 220 had a color depth of 128 bits, the image may be mapped to a color depth of 64 bits, 32 bits, 16 bits, and/or other suitable color depths. FIG. 3C is an example listing of pixel values in RGB format at a depth of 4 bits that have been mapped from the 8-bit pixel values of FIG. 3B. In some embodiments, the images may be two dimensional arrays of RGB or CMYK values specifying the pixels of the images. In some embodiments, this may have the effect of reducing the range of colors present in the image. This may be advantageous in that comparing colors between images may be performed more effectively and/or efficiently when the number of possible colors in an image is reduced.

At step 250, in some embodiments, the colors present in the image with the new color depth mapped at step 240 may be sorted. This may be accomplished by analysis module 29 of FIG. 1C. This may be performed as part of a hashing procedure for the image received at step 220. For example, if the image received at step 220 had a color depth of 128 bits, and at step 240 the image was mapped to a different color depth (such as 32 bits), then the colors in the 32 bit image may be collected and put into a list, an array, a matrix, or another suitable storage structure.

This may cause the image to be represented by a one dimensional array of colors. The colors may be stored with the amount each color is present in the image. For example, each color may be associated with a percentage value corresponding to the amount that color is present in the image as compared to the other colors in the image; the percentage values may be stored with their corresponding colors. The list of colors may also be sorted, in some embodiments, based on the amount that each color is present in the image. FIG. 3D illustrates an example list of colors (as RGB pixel values) derived from FIG. 3C sorted by the frequency in which the colors occur in FIG. 3C. Steps 240 and 250 provide examples of representations that may be generated of the image received at step 220 based on the colors of the image received at step 220.

At step 260, in some embodiments, the set of colors determined at step 240 may be compared to the images associated with known fraudulent users and/or known genuine users stored at step 210. This step may be performed by analysis module 29 of FIG. 1C. For example, the list of colors determined at step 240 may be compared to lists of colors found in images associated with known fraudulent users and/or known genuine users stored at step 210.

At step 270, in some embodiments, one or more thresholds may be applied to the comparisons performed at step 260. For example, the threshold(s) may determine whether a match will be determined between the image received at step 220 and any of the images stored at step 210. A match with an image of a known fraudulent user or a known genuine user may be determined by determining whether the list of colors determined at step 250 has the same colors as the list of colors stored at step 210. For example, if the list determined at step 250 was black, blue, green, and red, then a match may be determined with lists that also have the colors black, blue, green, and red. In some embodiments, a threshold may be specified by setting a minimum number of matching colors necessary to determine whether a match occurs. For example, it may be determined that 80 percent of the colors in the list determined at step 240 need to be present in any of the lists of colors stored at step 210 in order to determine that a match occurred. In this example, if the list determined that step 250 included black, blue, green, and red, a match may be determined with a list taken from those stored at step 210 that includes the colors black, blue, green, and white. In this example, a match would not be determined if the list determined at step 250 includes black, blue, green, and yellow and a list stored at step 210 includes the colors black, blue, green, red and brown.

In some embodiments, weights may also be associated with the comparisons performed at step 260. For example, if a match occurs because all of the colors in the set of colors determined at step 250 were present in a list of colors associated with an image known to be fraudulent, then a greater weight may be given to that match than if less than all colors were in common between the lists of colors. A threshold may be set using such weights to determine whether the image submitted at step 220 should be suspected as being submitted by a fraudulent user.

In some embodiments, the list of colors associated with the image received at step 220 and the lists of colors associated with the images associated with known fraudulent users and/or known genuine users may be sorted by the amount each color is present in their respective images. A threshold may be set such that a match is determined between the list of colors determined at step 250 and any of the lists of colors associated with images associated with known fraudulent users and/or known genuine users depending on whether the colors appear in the lists in the same order. For example, a match between a list that recited black, blue, green, and red and another list that recited black, blue, green, and purple may be determined because there were three corresponding colors that occurred in the same order between the lists. As another example, a match may not be determined between a list that recites black, blue, green, and red with a list that recites blue, black, green, and purple because the colors in common were not in the same order.

In some embodiments, if one or more of the thresholds are met, step 280 may be performed. If some or all of the thresholds were not met, then step 290 may be performed. For example, one threshold may indicate that a match occurs if at least 90 percent of the colors between the lists are in common, regardless of the order in which those colors occur in the list. Another threshold may indicate that a match occurs if the lists of colors have at least the first two colors in the list in common and in the same order. In some embodiments, analysis module 29 of FIG. 1C may be configured such that both example thresholds should be met before performing step 280. As another example, analysis module 29 may be configured such that only one of the thresholds should be met before performing step 280. As another example, analysis module 29 may be configured such that only one of the thresholds should be met before performing step 280. This may provide an advantage in that using one or more thresholds, multiple levels of tolerances may be applied when determining whether a user is to be suspected as being a fraudulent user. In some embodiments, the configuration of thresholds may also be determined based on the context that the image was received at step 220. For example, if the image was received as part of a user registration, one or more thresholds may be configured to be less stringent so that it is easier to meet the threshold(s) and proceed to step 280. As another example, if the image was received as part of a registered user's communication (such as changing a profile picture), one or more thresholds may be configured to be more stringent so that it is harder to meet the threshold(s) and proceed to step 280.

At step 280, in some embodiments, the image received at step 220 may be sent for further analysis. This step may be performed by analysis module 29 of FIG. 1C. This step may be performed as a result of one or more thresholds being met as discussed above with respect to step 270. In some embodiments, this may indicate that the user from which the image was received at step 220 is suspected as being a fraudulent user or a genuine user. The image may be sent to a human analyst or to another computer or set of computers for further analysis. Any of the images known to be associated with known fraudulent users and/or known genuine users that were compared to the image received at step 220 may also be sent for further analysis. Information determined or generated in steps 330, 340, 350, and 360 may also be sent for further analysis. For example, information that may be sent along with the image received at step 220 for further analysis may include: versions of the image at various color depths, one or more sets of colors associated with the image or versions of the image at various color depths, images associated with known fraudulent users that were compared to the image, and lists of colors included in images associated with known fraudulent users and/or known genuine users that were compared to one or more lists of colors in the image. The analysis may be used to determine whether the user now suspected as being a fraudulent user or a genuine user is a fraudulent user or a genuine user. For example, a human analyst may receive the image and matching images form the images associated with known fraudulent users on a computing device (such as a desktop computer). These images may be displayed at the same time so that the human analyst can perform a visual comparison and make a determination as to whether the image received at step 220 is associated with a known fraudulent user. The human analyst may then send a message, click one or more buttons using a mouse, or use one or more keystrokes on a keyboard to indicate the determination of whether the user associated with the image received at step 220 is a fraudulent user. The human analyst may send such a determination to server 20 of FIG. 1A and/or to another computing node coupled to network 24. In some embodiments, server 20 may receive the indication and perform certain tasks in response. For example, server 20 may suspend or delete an account used in one or more services offered by server 20 if server 20 receives an indication from the human analyst that the user associated with the account is fraudulent. In some embodiments, this may provide an advantage because it allows human analysts or computing devices running intensive detection and/or comparison algorithms to operate on a limited number of images received by server 20.

At step 290, in some embodiments, the image received at step 220 may be processed. This may occur because it has been determined by analysis module 29 of FIG. 1C that the image received at step 220 is not suspected as being sent from a fraudulent user because a match with a known fraudulent image was not determined at step 270. As another example, it may be determined at step 290 to suspect that the image received at step 220 is associated with a fraudulent user because a match with a known genuine image was not determined at step 270. Processing the image at this step may include different actions depending on the context in which the image was text received at step 220. For example, if the image received at step 220 was part of a registration request, then processing the image at this step may include activating a user account on server 20. As another example, if the image received at step 220 was part of updating a profile, then processing the image at this step may include updating an existing profile for one or more services offered by server 20 with the image. As another example, when it is determined to suspect that the user associated with the image received at step 220 is a fraudulent user, processing may involve further investigating the suspected user, activity of the suspected user, or sending the image to a human analyst for further review or to another computer or set of computers for further analysis.

In some embodiments, some or all of the steps of FIG. 2 may be repeated and/or omitted. For example, step 250 may not be performed and the comparison described at step 260 may be performed with lists of colors that are not placed in any particular order. As another example, steps 240-260 may be repeated in an iterative manner. For example, in a first iteration steps 240-260 may be performed using a particular color depth (i.e., 64 bits). In a second iteration, steps 240-260 may be performed using a different color depth (i.e., 16 bits). The number of iterations may be configured automatically or manually. For example, the number of iterations may be determined based on the context in which the image was received at step 220. A different number of iterations may be used for receiving the image in an account registration context than in a context where a profile is being updated.

Figure 4:
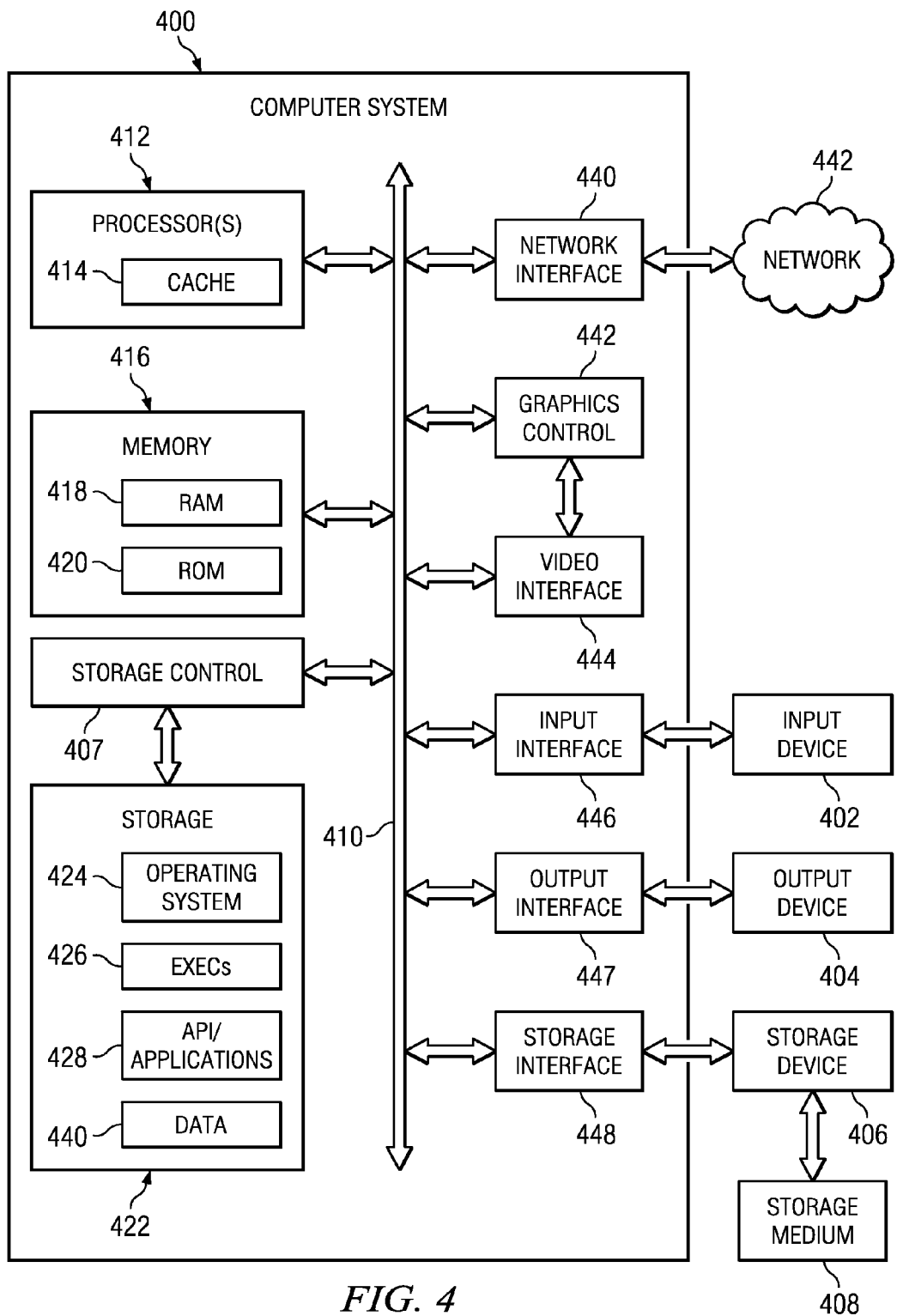
FIG. 4 illustrates an example computer system suitable for implementing one or more portions of particular embodiments.

FIG. 4 illustrates an example computer system 400 suitable for implementing one or more portions of particular embodiments. Although the present disclosure describes and illustrates a particular computer system 400 having particular components in a particular configuration, the present disclosure contemplates any suitable computer system having any suitable components in any suitable configuration. Moreover, computer system 400 may have take any suitable physical form, such as for example one or more integrated circuit (ICs), one or more printed circuit boards (PCBs), one or more handheld or other devices (such as mobile telephones or PDAs), one or more personal computers, one or more super computers, one or more servers, and one or more distributed computing elements. One or more components of FIGS. 1A-1C and one or more steps of FIG. 2 may be implemented using all of the components, or any appropriate combination of the components, of computer system 400 described below.

Computer system 400 may have one or more input devices 402 (which may include a keypad, keyboard, mouse, stylus, or other input devices), one or more output devices 404 (which may include one or more displays, one or more speakers, one or more printers, or other output devices), one or more storage devices 406, and one or more storage medium 408. An input device 402 may be external or internal to computer system 400. An output device 404 may be external or internal to computer system 400. A storage device 406 may be external or internal to computer system 400. A storage medium 408 may be external or internal to computer system 400. In some embodiments, terminals 10 and server 20 of FIG. 1A may be implemented using some or all of the components described above included in computer system 400. System bus 410 couples subsystems of computer system 400 to each other.

Herein, reference to a bus encompasses one or more digital signal lines serving a common function. The present disclosure contemplates any suitable system bus 410 including any suitable bus structures (such as one or more memory buses, one or more peripheral buses, one or more a local buses, or a combination of the foregoing) having any suitable bus architectures. Example bus architectures include, but are not limited to, Industry Standard Architecture (ISA) bus, Enhanced ISA (EISA) bus, Micro Channel Architecture (MCA) bus, Video Electronics Standards Association local (VLB) bus, Peripheral Component Interconnect (PCI) bus, PCI-Express bus (PCI-X), and Accelerated Graphics Port (AGP) bus.

Computer system 400 includes one or more processors 412 (or central processing units (CPUs)). A processor 412 may contain a cache 414 for temporary local storage of instructions, data, or computer addresses. Processors 412 are coupled to one or more storage devices, including memory 416. Memory 416 may include random access memory (RAM) 418 and read-only memory (ROM) 420. Data and instructions may transfer bidirectionally between processors 412 and RAM 418. Data and instructions may transfer unidirectionally to processors 412 from ROM 420. RAM 418 and ROM 420 may include any suitable computer-readable storage media.

Computer system 400 includes fixed storage 422 coupled bi-directionally to processors 412. Fixed storage 422 may be coupled to processors 412 via storage control unit 407. Fixed storage 422 may provide additional data storage capacity and may include any suitable computer-readable storage media. Fixed storage 422 may store an operating system (OS) 424, one or more executables (EXECs) 426, one or more applications or programs 428, data 430 and the like. Fixed storage 422 is typically a secondary storage medium (such as a hard disk) that is slower than primary storage. In appropriate cases, the information stored by fixed storage 422 may be incorporated as virtual memory into memory 416. In some embodiments, fixed storage 422 may include network resources, such as one or more storage area networks (SAN) or network-attached storage (NAS). In some embodiments, memory 26, storage structures 26a-b, and analysis module 29 of FIGURES 1A and 1C may be implemented using configurations such as the description of memory 416 above.

Processors 412 may be coupled to a variety of interfaces, such as, for example, graphics control 432, video interface 434, input interface 436, output interface 437, and storage interface 438, which in turn may be respectively coupled to appropriate devices. Example input or output devices include, but are not limited to, video displays, track balls, mice, keyboards, microphones, touch-sensitive displays, transducer card readers, magnetic or paper tape readers, tablets, styli, voice or handwriting recognizers, biometrics readers, or computer systems. Network interface 440 may couple processors 412 to another computer system or to network 442. Network interface 440 may include wired, wireless, or any combination of wired and wireless components. Such components may include wired network cards, wireless network cards, radios, antennas, cables, or any other appropriate components. With network interface 440, processors 412 may receive or send information from or to network 442 in the course of performing steps of particular embodiments. Particular embodiments may execute solely on processors 412. Particular embodiments may execute on processors 412 and on one or more remote processors operating together. In some embodiments, processors 412 may be used to implement analysis module 29 of FIG. 1C and/or may perform the steps specified in instructions or code included in analysis module 29 of FIG. 1C.

In a network environment, where computer system 400 is connected to network 442, computer system 400 may communicate with other devices connected to network 442. Computer system 400 may communicate with network 442 via network interface 440. For example, computer system 400 may receive information (such as a request or a response from another device) from network 442 in the form of one or more incoming packets at network interface 440 and memory 416 may store the incoming packets for subsequent processing. Computer system 400 may send information (such as a request or a response to another device) to network 442 in the form of one or more outgoing packets from network interface 440, which memory 416 may store prior to being sent. Processors 412 may access an incoming or outgoing packet in memory 416 to process it, according to particular needs.

Particular embodiments involve one or more computer-storage products that include one or more tangible, computer-readable storage media that embody software for performing one or more steps of one or more processes described or illustrated herein. In particular embodiments, one or more portions of the media, the software, or both may be designed and manufactured specifically to perform one or more steps of one or more processes described or illustrated herein. In addition or as an alternative, in particular embodiments, one or more portions of the media, the software, or both may be generally available without design or manufacture specific to processes described or illustrated herein. Example computer-readable storage media include, but are not limited to, CDs (such as CD-ROMs), FPGAs, floppy disks, optical disks, hard disks, holographic storage devices, ICs (such as ASICs), magnetic tape, caches, PLDs, RAM devices, ROM devices, semiconductor memory devices, and other suitable computer-readable storage media. In particular embodiments, software may be machine code which a compiler may generate or one or more files containing higher-level code which a computer may execute using an interpreter.

As an example and not by way of limitation, memory 416 may include one or more tangible, non-transitory, computer-readable storage media embodying software and computer system 400 may provide particular functionality described or illustrated herein as a result of processors 412 executing the software. Memory 416 may store and processors 412 may execute the software. Memory 416 may read the software from the computer-readable storage media in mass storage device 416 embodying the software or from one or more other sources via network interface 440. When executing the software, processors 412 may perform one or more steps of one or more processes described or illustrated herein, which may include defining one or more data structures for storage in memory 416 and modifying one or more of the data structures as directed by one or more portions the software, according to particular needs. In some embodiments, memory 26, storage structures 26a-b, and analysis module 29 of FIGS. 1A and 1C may be implemented using configurations such as the description of memory 416 above.

In some embodiments, the described processing and memory elements (such as processors 412 and memory 416) may be distributed across multiple devices such that the operations performed utilizing these elements may also be distributed across multiple devices. For example, software operated utilizing these elements may be run across multiple computers that contain these processing and memory elements. Other variations aside from the stated example are contemplated involving the use of distributed computing. In addition or as an alternative, computer system 400 may provide particular functionality described or illustrated herein as a result of logic hardwired or otherwise embodied in a circuit, which may operate in place of or together with software to perform one or more steps of one or more processes described or illustrated herein. The present disclosure encompasses any suitable combination of hardware and software, according to particular needs.

Although the present disclosure describes or illustrates particular operations as occurring in a particular order, the present disclosure contemplates any suitable operations occurring in any suitable order. Moreover, the present disclosure contemplates any suitable operations being repeated one or more times in any suitable order. Although the present disclosure describes or illustrates particular operations as occurring in sequence, the present disclosure contemplates any suitable operations occurring at substantially the same time, where appropriate. Any suitable operation or sequence of operations described or illustrated herein may be interrupted, suspended, or otherwise controlled by another process, such as an operating system or kernel, where appropriate. The acts can operate in an operating system environment or as stand-alone routines occupying all or a substantial part of the system processing.

Although several embodiments have been illustrated and described in detail, it will be recognized that substitutions and alterations are possible without departing from the spirit and scope of the appended claims.

What is claimed is:

1. A method executed by at least one processor comprising the steps of:
   receiving an image associated with a user;
   analyzing, by the at least one processor, the image;
   determining, by the at least one processor, a set of colors of the image based on the analysis of the image;
   generating, by the at least one processor, a representation of the image based on the determined set of colors;
   comparing, by the at least one processor, the representation of the image to one or more stored representations of a first set of images, the stored representations of the first set of images based on sets of colors of the first set of images;
   wherein the first set of images are associated with known users; and
   in response to comparing the representation of the image to the one or more stored representations of the first set of images, determining, by the at least one processor, that the user is a suspected fraudulent user.

2. The method of claim 1, wherein:
   generating the representation of the image based on the determined set of colors comprises:
      determining a first set of colors present in the image, each color of the first set of colors having a first color depth; and
      determining a second set of colors from the first set of colors by mapping the first set of colors to a second color depth, the second color depth being less than the first color depth; and
   comparing the representation of the image to the one or more stored representations of the first set of images comprises comparing the second set of colors to the one or more stored sets of colors of the first set of images.

3. The method of claim 2, wherein comparing the second set of colors to the one or more stored sets of colors comprises:
   assigning a percentage to each color of the second set of colors based on a percentage of the image that corresponds to each color of the second set of colors; and
   comparing the percentages associated with the second set of colors to the one or more stored sets of colors, each of the stored sets of colors comprising percentages of colors present in the corresponding image of the first set of images.

4. The method of claim 2, wherein comparing the second set of colors to the one or more stored sets of colors comprises:
   ordering the colors in the second set of colors based on an amount that each color of the second set of colors is present in the image; and
   in response to ordering the colors in the second set of colors, comparing the second set of colors to the one or more stored sets of colors, each stored set of colors comprising colors ordered based on an amount that each color is present in the corresponding image of the first set of images.

5. The method of claim 2, further comprising:
   determining a third set of colors from the first set of colors by mapping the first set of colors to a third color depth, the third color depth being less than the first color depth and different than the second color depth;
   comparing the third set of colors to the one or more stored representations of the first set of images; and
   wherein determining that the user is a suspected fraudulent user comprises determining that the user is a suspected fraudulent user in response to comparing the third set of colors to the one or more stored sets of colors.

6. The method of claim 1, further comprising:
   presenting the image for additional analysis in response to determining that the user is a suspected fraudulent user; and
   presenting an image associated with a known fraudulent user that corresponds to one of the stored representations for additional analysis.

7. The method of claim 6, further comprising receiving an indication that the user has been determined to be fraudulent.

8. The method of claim 1, wherein at least one image of the first set of images is associated with a known fraudulent user.

9. A system comprising:
   an interface configured to receive an image associated with a user; and
   at least one processor configured to:
      analyze the image;
      determine a set of colors of the image based on the analysis of the image;
      generate a representation of the image based on the determined set of colors;
      compare the representation of the image to one or more stored representations of a first set of images, the stored representations of the first set of images based on sets of colors of the first set of images;
      wherein the first set of images are associated with known users; and
      in response to comparing the representation of the image to the one or more stored representations of the first set of images, determine that the user is a suspected fraudulent user.

10. The system of claim 9, wherein:
    the at least one processor configured to generate the representation of the image based on the determined set of colors comprises the at least one processor configured to:
       determine a first set of colors present in the image, each color of the first set of colors having a first color depth; and
       determine a second set of colors from the first set of colors by mapping the first set of colors to a second color depth, the second color depth being less than the first color depth; and
    the at least one processor configured to compare the representation of the image to the one or more stored representations of the first set of images comprises the at least one processor configured to compare the second set of colors to the one or more stored sets of colors of the first set of images.

11. The system of claim 10, wherein the at least one processor configured to compare the second set of colors to the one or more stored sets of colors comprises the at least one processor configured to:

assign a percentage to each color of the second set of colors based on a percentage of the image that corresponds to each color of the second set of colors; and compare the percentages associated with the second set of colors to the one or more stored sets of colors, each of the stored sets of colors comprising percentages of colors present in the corresponding image of the first set of images.

12. The system of claim 10, wherein the at least one processor configured to compare the second set of colors to the one or more stored sets of colors comprises the at least one processor configured to:

order the colors in the second set of colors based on an amount that each color of the second set of colors is present in the image; and in response to ordering the colors in the second set of colors, compare the second set of colors to the one or more stored sets of colors, each stored set of colors comprising colors ordered based on an amount that each color is present in the corresponding image of the first set of images.

13. The system of claim 10, wherein the at least one processor is further configured to:

determine a third set of colors from the first set of colors by mapping the first set of colors to a third color depth, the third color depth being less than the first color depth and different than the second color depth;

compare the third set of colors to the one or more stored representations of the first set of images; and wherein the at least one processor configured to determine that the user is a suspected fraudulent user comprises the at least one processor configured to determine that the user is a suspected fraudulent user in response to comparing the third set of colors to the one or more stored sets of colors.

14. The system of claim 9, wherein the at least one processor is further configured to:

cause the image to be presented for additional analysis in response to determining that the user is a suspected fraudulent user; and cause an image associated with a known fraudulent user that corresponds to one of the stored representations to be presented for additional analysis.

15. The system of claim 14, wherein the interface is further configured to receive an indication that the user has been determined to be fraudulent.

16. The system of claim 9, wherein at least one image of the first set of images is associated with a known fraudulent user.

17. At least one computer-readable medium comprising a plurality of instructions that, when executed by at least one processor, are configured to:

receive an image associated with a user;

analyze the image;

determine a set of colors of the image based on the analysis of the image;

generate a representation of the image based on the determined set of colors;

compare the representation of the image to one or more stored representations of a first set of images, the stored representations of the first set of images based on sets of colors of the first set of images;

wherein the first set of images are associated with known users; and in response to comparing the representation of the image to the one or more stored representations of the first set of images, determine that the user is a suspected fraudulent user.

18. The at least one computer-readable medium of claim 17, wherein:

the plurality of instructions configured to generate the representation of the image based on the determined set of colors comprises the plurality of instructions configured to:

determine a first set of colors present in the image, each color of the first set of colors having a first color depth; and determine a second set of colors from the first set of colors by mapping the first set of colors to a second color depth, the second color depth being less than the first color depth; and the plurality of instructions configured to compare the representation of the image to the one or more stored representations of the first set of images comprises the plurality of instructions configured to compare the second set of colors to the one or more stored sets of colors of the first set of images.

19. The at least one computer-readable medium of claim 18, wherein the plurality of instructions configured to compare the second set of colors to the one or more stored sets of colors comprises the plurality of instructions configured to:

assign a percentage to each color of the second set of colors based on a percentage of the image that corresponds to each color of the second set of colors; and compare the percentages associated with the second set of colors to the one or more stored sets of colors, each of the stored sets of colors comprising percentages of colors present in the corresponding image of the first set of images.

20. The at least one computer-readable medium of claim 18, wherein the plurality of instructions configured to compare the second set of colors to the one or more stored sets of colors comprises the plurality of instructions configured to:

order the colors in the second set of colors based on an amount that each color of the second set of colors is present in the image; and in response to ordering the colors in the second set of colors, compare the second set of colors to the one or more stored sets of colors, each stored set of colors comprising colors ordered based on an amount that each color is present in the corresponding image of the first set of images.

21. The at least one computer-readable medium of claim 18, wherein the plurality of instructions are further configured to:

determine a third set of colors from the first set of colors by mapping the first set of colors to a third color depth, the third color depth being less than the first color depth and different than the second color depth;

compare the third set of colors to the one or more stored representations of the first set of images; and wherein the plurality of instructions configured to determine that the user is a suspected fraudulent user comprises the plurality of instructions configured to determine that the user is a suspected fraudulent user in response to comparing the third set of colors to the one or more stored sets of colors.

22. The at least one computer-readable medium of claim 17, wherein the plurality of instructions are further configured to:

cause the image to be presented for additional analysis in response to determining that the user is a suspected fraudulent user; and cause an image associated with a known fraudulent user that corresponds to one of the stored representations to be presented for additional analysis.

23. The at least one computer-readable medium of claim 22, wherein the plurality of instructions are further configured to receive an indication that the user has been determined to be fraudulent.

24. The at least one computer-readable medium of claim 17, wherein at least one image of the first set of images is associated with a known fraudulent user.

* * * * *